Patented Mar. 17, 1942

2,276,664

UNITED STATES PATENT OFFICE 2,276,664

MANUFACTURE OF 4-AMINOBENZENE-SULPHONAMIDE

Fritz Mietzsch, Robert Behnisch, and Josef Klarer, Wuppertal-Elberfeld, Germany, assignors to Winthrop Chemical Company, Inc., New York, N. Y., a corporation of New York No Drawing. Application March 18, 1939, Serial No. 262,780. In Germany March 25, 1938

7 Claims. (Cl. 260—397.7)

The present invention relates to a process of manufacturing 4-aminobenzene-sulphonamide.

In the specification for Letters Patent No. 2,132,178 a process for the manufacture of 4-aminobenzene-sulphonamide is described by which a pure preparation, free from toxic impurities and therapeutically suitable as a remedy for human beings is manufactured in a simple way. The toxic impurities essentially have proved as being 4.4'-diamino-diphenylsulphone. This product is obtained in the form of its acyl derivative when reacting chlorosulphonic acid upon an acylanilide as a by-product, 4-acyl-amino-benzenesulphochloride being the main product; the said acyl derivative remains unchanged when the reaction mixture subsequently is reacted with ammonia, but it is converted into 4.4'-diamino-diphenylsulphone by means of subsequent saponification. The process described in the above-named patent specification consists in treating the 4 - aminobenzene - sulphonamide which previously was considered as being very sensitive to alkali (comp. Gelmo, Journ. für prakt. Chemie, [2] 77 (1908) p. 372), just with alkaline agents or in saponifying the 4-acetyl-amino-benzenesulphonamide with alkali and separating the 4-aminobenzene-sulphonamide thus obtained from the alkaline agent by decreasing the degree of alkalinity. The 4.4'-diaminodiphenylsulphone which is not able to form an alkali metal salt and at the same time is difficulty soluble in water, is separated by filtration from the alkali metal salt of the 4-aminobenzene-sulphonamide which is readily soluble in water before the alkalinity of the mixture has been decreased.

According to the present invention it has been found that the separation of the sulphonamides from the sulphones, due to the behaviour against alkalis can be performed in a more complete manner with the acylamino compounds than it can be performed with the free amino compounds, since the acyl compounds of the 4.4'-di-amino-diphenylsulphone are still less soluble in water than the free 4.4'- diamino-diphenylsulphone, while the salts of the 4-acylamino-benzenesulphonamides similar as those of the free 4-aminobenzene-sulphonamide are readily soluble in water. Simultaneously in this manner the 4.4'-diacyldiamino-diphenylsulphones are obtained, which in contradistinction to the free 4.4'-diamino-diphenylsulphone are useful remedies. Accordingly the process of the present invention is carried out by treating, preferably at ordinary temperature, the crude 4-acylamino-benzenesulphonamide obtained in the manner indicated above with the aqueous solution of an alkaline agent forming with the 4-acylamino-benzenesulphonamide a water soluble salt, that is an alkali metal hydroxide, filtering off the undissolved components, particularly the 4.4'-di-acyldiamino-diphenylsulphone from the solution and then precipitating the 4-acylamino-benzenesulphonamide by removing the free alkali metal hydroxide from the solution, for instance by decreasing the alkalinity, neutralizing or acidifying the mixture and subsequently splitting off the acyl group from the 4-acylamino-benzenesul-phonamide obtained by saponification. The dissolving of the 4-acylamino-benzenesulphonamide compound in the alkaline agent is preferably combined with the saponification step and the precipitation of the pure 4-aminobenzene-sulphonamide by heating the alkaline solution of the crude 4 - acylaminobenzenesulphonamide freed by means of filtration from the 4.4'-diacyl-diamino-diphenylsulphone—if desired after a further addition of alkali—for saponification, and by precipitating the free 4-aminobenzene-sul-phonamide from the reaction mixture by removing the free alkali metal hydroxide, for instance by decreasing the alkalinity of the mixture. This may be done, for instance, by the addition of ammonia or amine salts or salts of the alkali and alkaline-earth metals with weak acids, for instance, sodium, potassium and calcium carbonate, sodium borate, secondary sodium phosphate, sodium or potassium acetate or propionate and the like. The alkali metal hydroxide may also be removed from the solution by neutralization or even by rendering the solution acid by means of weak acids, such as acetic acid.

The invention is illustrated by the following examples without being restricted thereto:

Example 1

214 grams of crude 4-acetylamino-benzenesul-phonamide are treated at a temperature of 25° C. with 110 ccs. of 10-normal sodium hydroxide solution and 750 ccs. of water in the presence of charcoal for 30 minutes while stirring, and the mixture is then filtered. The pure 4-acetyl-amino-benzenesulphonamide is precipitated from the filtrate by the addition of ammonium chloride or by acidifying with acetic or hydrochloric acid and then saponified either with acid or with alkali. The first precipitate containing charcoal, containing about 1% of the starting-material in the form of 4.4'-diacetyldiamino-diphenylsul-phone may be dried after removal of the excess alkali by washing and thereupon extracted with about 12 parts of boiling ethylene glycol. The pure 4.4'-diacetyldiamino-diphensylsulphone crystallizes from the filtered ethylene glycol solution.

Example 2

85 grams of solid sodium hydroxide are added to the solution of crude 4-acetylamino-benzenesulphonamide, purified and filtered according to the directions indicated in Example 1. The mixture is boiled for one hour. After cooling the 4-aminobenzene-sulphonamide thus obtained is precipitated in a pure state from the solution by the addition of ammonium chloride or by neutralization.

We claim:

1. The process which comprises treating the crude reaction product, produced by reacting an acylanilide, the acyl radical of which is derived from a carboxylic acid, with chlorosulphonic acid and the para-acylamino-benzenesulphochloride formed with ammonia, with an aqueous alkali metal hydroxide solution, filtering off the undissolved components, precipitating the para-acylamino-benzenesulphonamide from the filtrate by decreasing its alkalinity and splitting off the acyl group from the 4-acylamino-benzenesulphonamide obtained by saponification.

2. The process as defined in claim 1 in which the alkaline filtrate is heated to a sufficient temperature to effect the splitting off of the acyl group from the 4-acylaminobenzene-sulphonamide and decreasing the alkalinity of the resulting alkaline solution to effect precipitation of the 4-aminobenzene-sulphonamide formed in the heating step.

3. The process which comprises treating the crude reaction product, produced by reacting acetanilide with chlorosulphonic acid and the para-acetylamino-benzenesulphochloride formed with ammonia, with an aqueous alkali metal hydroxide solution, filtering off the undissolved components, precipitating the para-acetylamino-benzenesulphonamide from the filtrate by decreasing its alkalinity and splitting off the acetyl group from the 4-acetylamino-benzenesulphonamide obtained by saponification.

4. The process as defined in claim 3 in which the alkaline filtrate is heated to a sufficient temperature to effect the splitting off of the acetyl group from the 4-acetylaminobenzenesulphonamide and decreasing the alkalinity of the resulting alkaline solution to effect precipitation therefrom of the 4-aminobenzenesulphonamide formed in said heating step.

5. The process which comprises treating the crude reaction product, produced by reacting acetanilide with chlorosulphonic acid and the para-acetylamino-benzenesulphochloride formed with ammonia, with an aqueous alkali metal hydroxide solution, filtering off the undissolved components, precipitating the para-acetylamino-benzenesulphonamide from the filtrate by decreasing its alkalinity by the addition of ammoniumchloride and splitting off the acetyl group from the 4-acetylamino-benzenesulphonamide obtained by saponification.

6. The process as defined in claim 5 in which the alkaline filtrate is heated to a sufficient temperature to effect the splitting off of the acetyl group from the 4-acetylaminobenzene-sulphonamide and adding ammonium chloride to decrease the alkalinity of the resulting alkaline solution to effect precipitation of the 4-aminobenzene-sulphonamide formed in said heating step.

7. Process as claimed in claim 1 in which the undissolved components, obtained by filtration of the solution of the crude starting product in aqueous alkali metal hydroxide, are freed from excess alkali and are then recrystallized.

FRITZ MIETZSCH.
ROBERT BEHNISCH.
JOSEF KLARER.